United States Patent [19]

Ritzow

[11] Patent Number: 5,328,049
[45] Date of Patent: Jul. 12, 1994

[54] VIVARIUM

[75] Inventor: Gerald R. Ritzow, Franklin, Wis.

[73] Assignee: All-Glass Aquarium Co., Inc., Franklin, Wis.

[21] Appl. No.: 52,476

[22] Filed: Apr. 23, 1993

[51] Int. Cl.⁵ .................................................. B65D 43/12
[52] U.S. Cl. ........................................ 220/345; 220/346; 220/326
[58] Field of Search ............... 220/493, 494, 345, 346, 220/324, 326; 215/322; 119/19, 17, 165, 166

[56] References Cited

U.S. PATENT DOCUMENTS

| | | | |
|---|---|---|---|
| 3,180,697 | 4/1965 | Mulch | 220/345 |
| 3,647,102 | 3/1972 | Cooley | 220/345 |
| 3,667,648 | 6/1972 | Koziol | 220/345 |
| 3,771,686 | 11/1973 | Brison | 220/345 |
| 4,744,614 | 5/1988 | Gombosi | 220/345 |
| 4,763,607 | 8/1988 | Tominaga | 119/19 |
| 5,102,001 | 4/1992 | Teague et al. | 220/324 |

Primary Examiner—Gary E. Elkins
Assistant Examiner—S. Castellano
Attorney, Agent, or Firm—Andrus, Sceales, Starke & Sawall

[57] ABSTRACT

This invention relates to a vivarium for keeping, raising, and/or observing animals or plants. The present invention provides a vivarium comprised of a generally rectangular tank having four side walls and a base. A pair of guide tracks extend generally along the upper edge of two of the side walls. A cover is provided which slides horizontally onto the vivarium along the guide tracks. A stop along one edge of the cover engages a clip, hanging over one of the side walls of the vivarium, when the cover is in a closed position. When the stop has engaged the clip, a locking pin may be inserted through the stop to prevent the unauthorized access to the interior of the vivarium.

4 Claims, 2 Drawing Sheets

VIVARIUM

BACKGROUND AND SUMMARY OF THE INVENTION

This invention relates to a vivarium for keeping, raising and/or observing animals or plants.

Vivariums typically include glass side walls bonded to each other along the corners and to a base. A cover made of screen material is placed on top of the vivarium to allow the flow of air into the interior of the vivarium and to prevent the animals, insects or reptiles within the walls from escaping. Access to the interior of the vivarium is usually accomplished by simply lifting the cover off the side walls. While this allows for easy access to the interior of the vivarium, it also allows for easy escape from the vivarium by the animals kept inside.

The present invention provides for a vivarium comprised of a generally rectangular tank having four side walls and a base. A pair of guide tracks extend generally parallel along the upper edge of two side walls. A generally rectangular cover is provided. The cover slides along the guide tracks in a horizontal relation between a first position, which allows access to the interior of the vivarium, and a second closed position which prevents access to the interior of the vivarium. A stop is provided to insure that the cover does not slide horizontally past the closed position so as to allow access to the interior of the vivarium.

A clip having a recess for receipt of the stop when the cover is in the closed position is also provided. The clip hangs generally equidistant from each of the guide tracks over the edge of a side wall. The clip has a downwardly sloping ramp extending away from the side wall on which it is hung such that the stop slides forwardly up the ramp and down into the recess when the cover is slid into the closed position. An aperture extends downwardly through the ramp of the clip for receipt of a locking pin. When a padlock is locked on the locking pin, the pin cannot be removed from the clip, and the cover cannot be slid from the closed position. As a result, access to the interior of the vivarium is prevented.

DETAILED DESCRIPTION OF THE INVENTION

Figure 1:
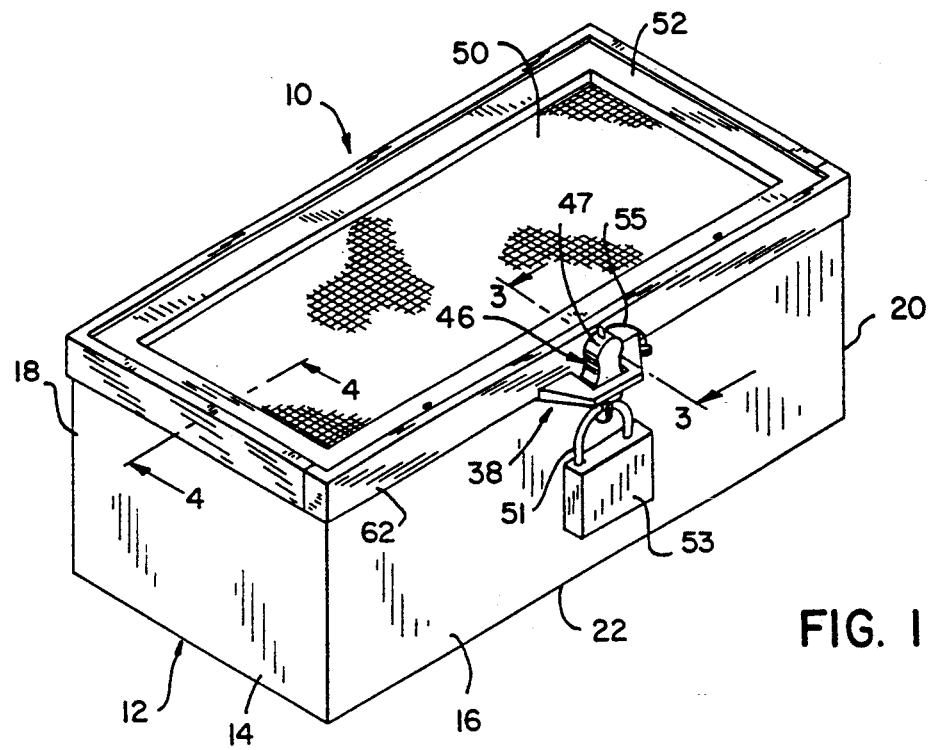
FIG. 1 is a perspective view of a vivarium constructed in accordance with the invention, with the cover in a closed position.

The vivarium is generally designated by the reference numeral 10. The vivarium 10 is comprised of a generally rectangular tank 12 having four side walls 14, 16, 18 and 20, FIGS. 1 and 2. Each side wall is bonded to each other along the corners and to a base 22.

The side walls 14, 18 and 20 are of an equal height. Side wall 16 has a height slightly less than that of side walls 14, 18 and 20 in order to accommodate the front of a cover 24 and a locking mechanism for the vivarium, to be described.

Figure 2:
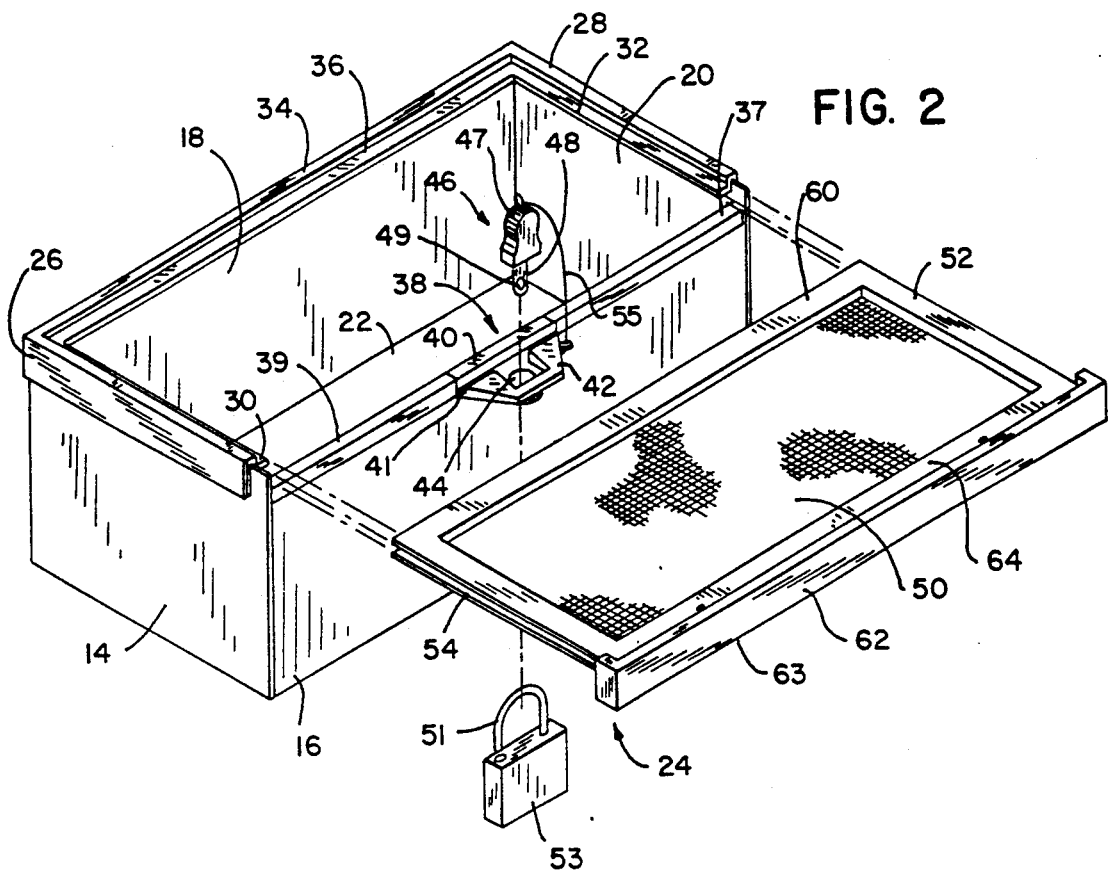
FIG. 2 is an exploded perspective view of the components of FIG. 1.
Figure 4:
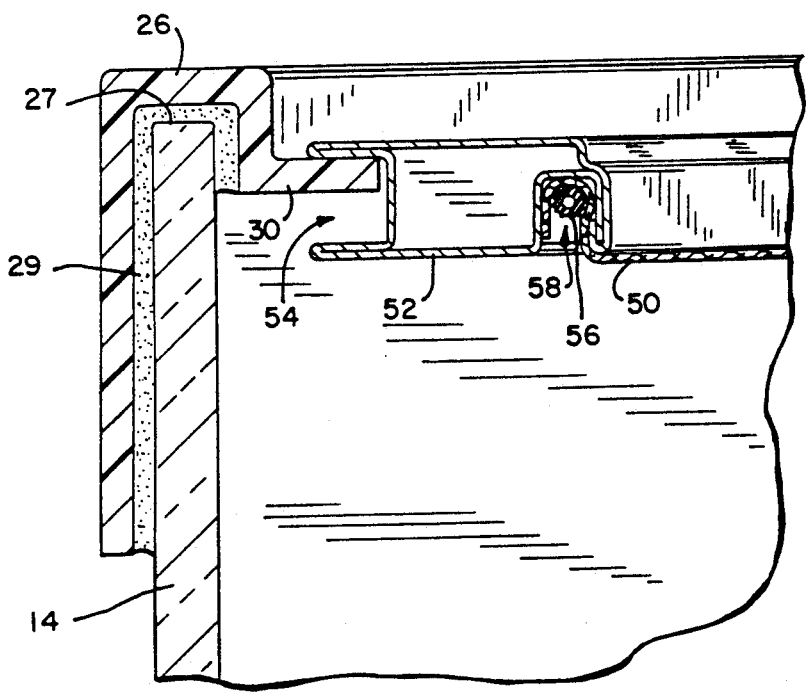
FIG. 4 is a partial sectional view taken along line 4—4 of FIG. 1.

Generally parallel guide rails 26 and 28, FIG. 2, extend longitudinally along the length of side walls 14 and 20. As depicted in FIG. 4, guide rail 26 is hung on top edge 27 of side wall 14. An adhesive material 29 is used to affix guide tracks 26 and 28 to the side walls 14 and 20.

Lips 30 and 32 extend longitudinally along the length of guide rails 26 and 28 to allow for receipt of cover 24 in a horizontal sliding relationship. Each lip 30 and 32 is disposed toward the interior of tank 10.

A third guide rail 34 extends longitudinally along side wall 18 and is generally perpendicular to guide rails 30 and 32. Like guide rails 26 and 28, guide rail 34 is hung on the top of side wall 18 and affixed to the side wall 18 by means of an adhesive. Guide rail 34 has a lip 36 disposed toward the interior of the vivarium 10. Lip 36 prevents cover 34 from sliding beyond a predetermined closed position and, when the cover 24 is in a closed position, lip 36 acts as a support for the cover 24.

Figure 3:
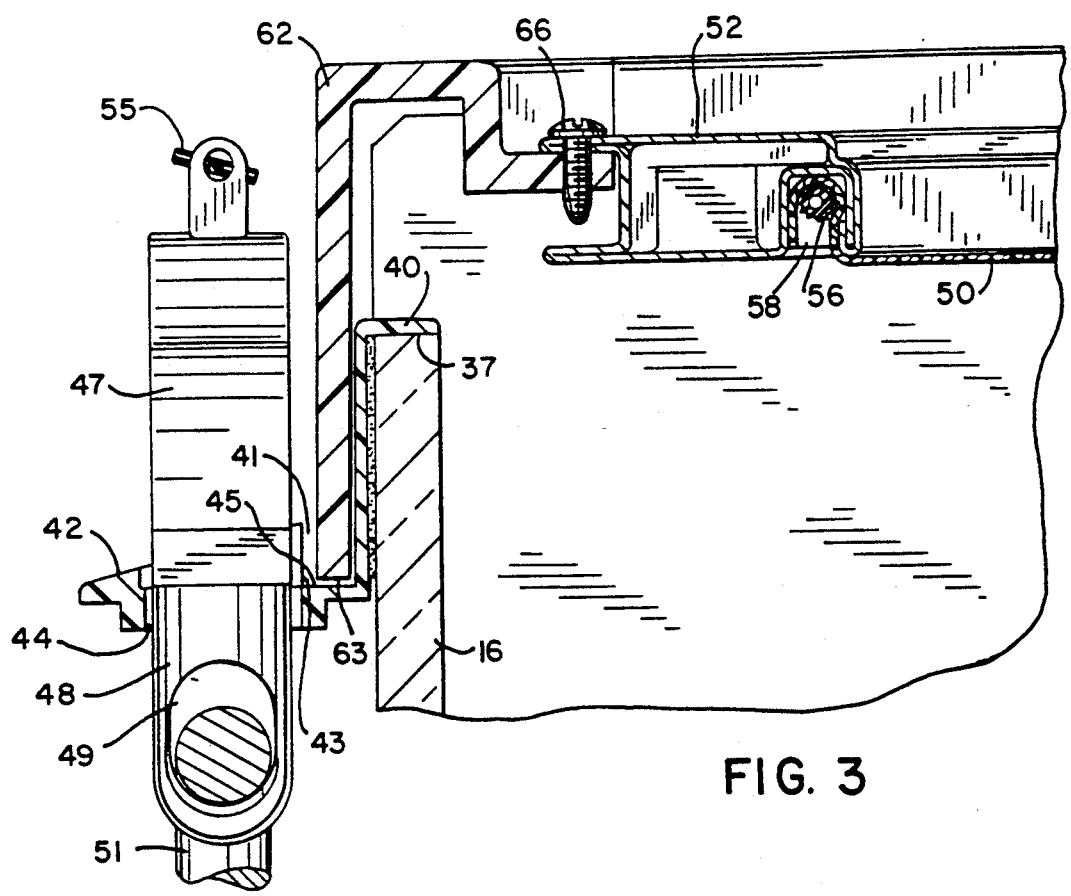
FIG. 3 is a partial sectional view taken along line 3—3 of FIG. 1.

A clip 38, FIGS. 2 and 3, is hung generally equidistant from guide tracks 26 and 28 on side wall 16. The clip is comprised of a hanging member 40 and a ramp 42 extending downwardly away from side wall 16. A recess 41 is defined by an abutment surface 43 extending vertically downward from the ramp 42 and a bottom surface 45 interconnecting the abutment surface 43 and the hanging member 40. An aperture 44 extends downwardly through ramp 42 and is positioned in order to accommodate a locking pin 46.

The locking pin 46 is comprised of a user grippable head or handle portion 47 and a shank 48 extending downwardly therefrom. An aperture 49 extends through shank 48 for receipt of a locking bar 51 of a padlock 53. A tie 55 interconnects the handle portion 47 with the clip 38.

Protective moldings 37 and 39 are placed along the upper edge of side wall 16 on each side of clip 38, to prevent chipping of the upper edge of the side wall 16. In some embodiments, particularly for longer left-right spans of side wall 16, two clips are used, together with a central protective molding therebetween, in addition to protective moldings 37 and 39. The embodiment shown has a 16 inch left-right span, and a single clip is used. Other embodiments include 20 inch and 24 inch spans and use two clips. In other embodiments, the left-right span of side wall 16 is shortened, and the front to back span of side walls 14 and 20 are lengthened, to maintain volume while reducing frontal shelf space required of the dealer.

The cover 24 is comprised of a generally rectangular screen 50, FIG. 2, affixed to a generally rectangular border 52 extending around the periphery of the screen 50. The screen 50 is affixed to the border 52 by means of an elastic band 56, FIGS. 3 and 4. The screen is placed within a cavity 58 in border 52. The elastic band 56 is then placed over screen 50 and into cavity 58. The tension of the elastic band 56 maintains the screen within the cavity 58, thereby affixing the screen 50 to the border 52.

Two parallel grooves 54 (only one pictured) extend longitudinally along opposite sides of border 52. As depicted in FIG. 4, the grooves 54 are provided for receipt of lips 30 and 32 of guide rails 26 and 28, respectively, such that cover 24 is slidable on the lips 30 and 32 in a horizontal relation. An additional groove (not pictured) extends longitudinally along edge 60 of cover 24 perpendicular to grooves 54. The groove on side 60 of border 52 forms a mating relationship with the lip 36 of the guide track 34 when the cover 24 is in a closed position in order to stop the horizontal sliding of the cover 24 and to support the cover 24.

A stop 62, FIG. 2, is provided along the edge 64 of the cover 24. The stop extends longitudinally along the entire length of edge 64 perpendicular to grooves 54 and parallel to the groove (not pictured) on edge 60. The stop 62 is affixed to the border 52 by means of sheet metal screws 66, FIG. 3.

In operation, cover 24 is placed on vivarium 10 such that grooves 54 horizontally engage lips 30 and 32 of guide rails 26 and 28, respectively. In order to close the vivarium 10, the cover 24 is slid horizontally along lips 30 and 32. As the cover 24 is horizontally slid into a closed position whereby access to the interior of the vivarium 10 is prevented, the bottom edge 63, FIG. 3, of stop 62 engages and slides upwardly along ramp 42. When in the closed position, the groove on edge 60 engages the lip 36 on guide rail 34. In addition, the stop 62 slides beyond ramp 42 into recess 41. As depicted in FIG. 1, shank 48 of locking pin 46 is inserted through aperture 44 of the clip 38. Handle portion 47 is wider than aperture 44. Padlock 53 is locked on locking pin 46 such that locking bar 51 extends through aperture 49. This prevents removal of locking pin 46, which in turn prevents unauthorized access into the vivarium 10, i.e. in FIG. 3, handle portion 47 blocks leftward movement of stop 62, even if bottom edge 63 is lifted to clear ramp 42. Without locking pin 46, the cover 24 is still held in place in its closed position with stop 62 in recess 41, and with abutment surface 43 blocking leftward movement of bottom edge 63 therepast; however, the cover may be released to move to its open position by lifting the front of the cover slightly until bottom edge 63 clears surface 43.

It can be seen from this description that the invention accomplishes at least all of its stated objectives.

What is claimed is:

1. A vivarium having an interior, comprising:

a tank having a plurality of side walls and a base, each side wall having an upper edge opposite to the base;

a cover;

a pair of guide tracks extending generally parallel along the upper edge of a first and a second of the side walls for receiving the cover in a horizontal sliding relation, the cover slidable between a first open position to allow access to the interior of the vivarium and a second closed position so as to prevent access to the interior of the vivarium; and means for maintaining the cover in the closed position:

wherein the means for maintaining the cover in the closed position is comprised of:

a stop attached to an edge of the cover in a plane perpendicular to the guide tracks; and a clip hanging over an edge of a third of the side walls and between the guide tracks, said stop being retainable in said clip;

wherein the clip is further comprised of a hanging member affixed to the third of the side walls and a downward sloping ramp extending away from the third of the side walls on which the clip is hung, the hanging member and the ramp defining a recess for receipt of the stop when the cover is in the closed position;

wherein the clip is further comprised of an aperture extending downwardly through the ramp of the clip for receipt of a locking pin such that the locking pin prevents the removal of the stop from the recess when the locking pin engages the clip.

2. A vivarium having an interior, comprising:

a tank having a plurality of side walls and a base, each side wall having an upper edge opposite to the base;

a cover;

a pair of guide tracks extending generally parallel along the upper edge of a first and a second of the side walls for receiving the cover in a horizontal sliding relation, the cover slidable between a first open position to allow access to the interior of the vivarium and a second closed position so as to prevent access to the interior of the vivarium; and means for maintaining the cover in the closed position:

wherein the means for maintaining the cover in the closed position is comprised of:

a stop attached to an edge of the cover in a plane perpendicular to the guide tracks; and a clip hanging over an edge of a third of the side walls and between the guide tracks, said stop being retainable in said clip;

wherein the clip is further comprised of a hanging member affixed to the third of the side walls and a downward sloping ramp extending away from the third of the side walls on which the clip is hung, the hanging member and the ramp defining a recess for receipt of the stop when the cover is in the closed position;

wherein the clip is further comprised of an aperture extending downwardly through the ramp of the clip for receipt of a locking pin such that the locking pin prevents the removal of the stop from the recess when the locking pin engages the clip;

wherein said locking pin includes a means for receiving a lock locked thereto while the locking pin engages the clip to prevent removal of said locking pin, to in turn maintain the cover in the closed position.

3. A vivarium comprising:

a tank having a plurality of side walls and a base, each side wall having an upper edge opposite to the base;

a pair of guide tracks extending generally parallel along the upper edge of a first and a second of the side walls, each guide track having a lip extending therealong, each lip of each guide track directed toward the other guide track;

a cover comprised of a border extending partially around a screen, the border having two generally parallel grooves extending longitudinally along opposite sides of the cover for receipt of the lips such that the cover may slide along the lips in a horizontal relation between a first open position to allow access to the interior of the vivarium and a second closed position so as to prevent access to the interior of the vivarium;

a stop affixed to an edge of the cover, the edge extending generally perpendicular to the grooves;

a clip hanging over an edge of a third of the side walls and between each of the guide tracks, the clip being comprised of a hanging member for hanging the clip over the edge of the third of the side walls and a downward sloping ramp extending away from the third of the side walls on which the clip is hung, the hanging member and the ramp defining a recess for receipt of the stop when the cover is in the closed position; and a locking pin secured on the ramp so as to maintain the cover in the closed position.

4. The device of claim 3 further comprising a third guide track extending along the upper edge of a fourth of the side walls opposite to the third of the side walls on which the clip hangs, the third guide track being generally perpendicular to the pair of generally parallel guide tracks.

* * * * *